(12) United States Patent
Brinkmann (10) Patent No.: US 8,153,236 B2
(45) Date of Patent: Apr. 10, 2012

(54) ROOF COVERING FOR A BUILDING HAVING A ROOF WITH STRUCTURED ROOF TILES AND A STRUCTURE PROJECTING OUT FROM THE ROOF SURFACE, SUCH AS A CHIMNEY, A WINDOW, A WALL, OR VENTILATING PIPE

(76) Inventor: Peter Brinkmann, Limburg (DE)

( * ) Notice: Subject to any disclaimer, the term of this patent is extended or adjusted under 35 U.S.C. 154(b) by 189 days.

(21) Appl. No.: 12/498,527

(22) Filed: Jul. 7, 2009

(65) Prior Publication Data

US 2009/0266011 A1    Oct. 29, 2009

Related U.S. Application Data

(63) Continuation of application No. 11/028,724, filed on Jan. 4, 2005, now abandoned, which is a continuation-in-part of application No. PCT/DE03/02237, filed on Jul. 4, 2003.

(30) Foreign Application Priority Data

Jul. 5, 2002 (DE) .................................. 102 30 552

(51) Int. Cl.
*B32B 3/24* (2006.01)

(52) U.S. Cl. ........ 428/182; 442/378; 442/395; 442/396; 442/397; 442/398; 442/399; 52/198; 52/273; 52/741.1

(58) Field of Classification Search .................. 428/182; 442/378, 395–399; 52/198, 273, 741.4
See application file for complete search history.

(56) References Cited

U.S. PATENT DOCUMENTS

| | | | | |
|---|---|---|---|---|
| 4,287,248 A | * | 9/1981 | Gessner et al. | 428/137 |
| 5,002,816 A | * | 3/1991 | Hofmann et al. | 428/138 |
| 5,030,507 A | * | 7/1991 | Mudge et al. | 442/147 |
| 5,385,774 A | * | 1/1995 | Cramer et al. | 442/229 |
| 5,426,898 A | * | 6/1995 | Larsen | 52/58 |
| 6,258,439 B1 | * | 7/2001 | Hofmann | 428/138 |

FOREIGN PATENT DOCUMENTS

JP        53125327 A  * 11/1978

* cited by examiner

*Primary Examiner* — Elizabeth Cole
(74) *Attorney, Agent, or Firm* — Nils H. Ljungman & Associates (57) ABSTRACT

A roof covering for a building having a roof with structured roof tiles and a structure projecting out from the roof surface, such as a chimney, a window, a wall, or ventilating pipe. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 6 Drawing Sheets

ROOF COVERING FOR A BUILDING HAVING A ROOF WITH STRUCTURED ROOF TILES AND A STRUCTURE PROJECTING OUT FROM THE ROOF SURFACE, SUCH AS A CHIMNEY, A WINDOW, A WALL, OR VENTILATING PIPE

CONTINUING APPLICATION DATA

This application is a continuation of U.S. patent application Ser. No. 11/028,724, filed on Jan. 4, 2005 now abandoned. U.S. patent application Ser. No. 11/028,724 was a continuation-in-part application of International Patent Application PCT/DE2003/002237, filed on Jul. 4, 2003, which claims priority from Federal Republic of Germany Patent Application No. 102 30 552.8, filed on Jul. 5, 2002. International Patent Application PCT/DE2003/002237 was pending as of the filing date of U.S. patent application Ser. No. 11/028,724. The United States was an elected state in International Patent Application PCT/DE2003/002237.

BACKGROUND

1. Technical Field

The present application relates to a building having a roof with structured roof tiles and a structure projecting out from the roof surface, such as a chimney, a window, a wall, or ventilating pipe and to a method of constructing a roof of a building covered with structured roofing tiles and a structure projecting out from the roof surface, such as a chimney, a window, a wall, or ventilating pipe and also the gap between a ridge, an arris or hip covering. The present application further relates to stretchable band material with at least one supporting layer and one covering layer, the band material showing a multiplicity of folds whose edges extend crosswise to the stretching direction and substantially parallel to each other. Such a band material is able to mould round textured surfaces showing unevenness, curvatures or spherical convexities and is used for packaging and sealing purposes.

2. Background Information

Methods are known for constructing a roof of a building covered with structured roofing tiles and a structure projecting out from the roof surface, such as a chimney, a window, a wall, or ventilating pipe and also the gap between a ridge, an arris or hip covering which covers the surface of the roof of a building covered with structured roofing tiles and a structure projecting out from the roof surface, such as a chimney, a window, a wall, or ventilating pipe, and also the gap between a ridge, an arris or hip, etc. In these cases the surface of the roof of a building covered with structured roofing tiles and a structure projecting out from the roof surface, such as a chimney, a window, a wall, or ventilating pipe, and also the gap between a ridge, an arris or hip, etc., the area between an essentially planar surface or straight edge and a three-dimensional structured surface must be covered whereby the three-dimensional, structured surface is larger than its projection into the plane. The covering must therefore be extendable in at least that region abutting the three-dimensional, structured surface.

Upon constructing a roof of a building covered with structured roofing tiles and a structure projecting out from the roof surface, such as a chimney, a window, a wall, or ventilating pipe and also the gap between a ridge, an arris or hip covering, such covering material in the form of sheets, strips or widths is required as covering on the roof of a building, for example, to seal the gap between the surface of the roof covered with structured roofing tiles and a structure projecting out from the roof surface, such as a chimney, a window, a wall, or ventilating pipe, or also the gap between a ridge, an arris or hip, etc. In these cases, the gap between an essentially planar surface or straight edge and a three-dimensional structured surface must be covered so as to be water-tight, whereby the three-dimensional, structured surface is larger than its projection into the plane. The covering must therefore be extendable in at least that region abutting the three-dimensional, structured surface.

Such a band material is known from the document DE 195 23 834 A1. It concerns a stretchable covering material which can be manually distorted in at least one direction, comprising an extensible supporting element showing breaches, and a surface covering coating, said supporting element showing at least on its upper side a coating of thin flat material bound to it and the coated covering material being compressed in an opposite direction with respect to the stretching direction. In practice the supporting element comprises soft-annealed aluminium in the form of a grid of expanded metal with corrugated ridges. Said grid is coated with a skin of extensible plastic material for sealing purpose, which is applied to non-woven material. The non-woven material provided with the skin forms the surface covering coating of the supporting element. The waterproof covering of a surface by means of this covering material is due to the plastic skin applied on the non-woven material and carried by the metal grid. The manufacture of this at least three-ply covering material has proved to be relatively expensive because the required metal grid is expensive on one hand, and, on the other hand, it is a sharp-edged expanded metal so that it has to be carefully trimmed before the coating process in order to avoid that the plastic skin might be damaged or pierced.

OBJECT OR OBJECTS

An object is to create an economical covering material for covering the gap between a planar surface and a structured surface, in particular a highly structured roof surface, which material can be extended in at least one direction. An object also is to provide a waterproof band material which is less expensive than the known covering material and less sensitive.

SUMMARY

According to the present application, the object may be realised in that the supporting layer can comprise fibres of organic material, in that the covering layer shows a foil of ductile metal and in that the folds can have the shape of small folds bordering one another in which the additional material needed for stretching may be stored.

The supporting layer comprising fibres of organic material may confer to the band material a high resistance to tearing. Natural fibres, such as wool or silk, as well as such ones of plastic may be taken into consideration as organic material, the length, the diameter, the shape of the cross section and the chemical composition of the fibres being optimally adaptable to the purpose of the application of the band material. Fibres of polyethylene, polypropylene, polyacrylnitrile, polyester or polyamide may be recommended as especially appropriate. The supporting layer may increase the resistance to tearing of the metallic covering layer and may prevent it from a too strong crumpling in the area of the edges of the small folds.

The metallic foil of the covering layer can be plastically mouldable and may not produce any restoring force due to the ductility of the material used so that the band material keeps the shape for instance after moulding around an uneven base and may not intend to come back to its previous shape. Possibly lead, copper or soft-annealed aluminium can be taken into consideration as ductile metals for the metallic foil of the covering layer.

The small folds defined according to the present application may be small folds, about 10 or more of which can be arranged within one centimeter of the band material, possibly 30 or more folds per centimeter. The folds may border one another, edges issuing from clockwise folding alternating with edges issuing from anticlockwise folding. The space between two edges formed by two opposite foldings may not be substantially more than 1 mm and may not always be the same. A fold may not extend over the whole width of the band material, either. The small folds may perfectly be irregular and of different shape. The small folds may be possibly impressed into the originally even two-ply band material, the material being compressed in an opposite direction or diagonally with respect to the stretching direction. The importance of the compression may determine the later possible extension. For example, a band compressed to the half of its previous length can thus be later extended up to just twice the length. The additional material needed for stretching out can be stored in the small folds which can be drawn flat when stretching. It is clear that the maximum stretching may be obtained in the stretching direction extending in a right angle with respect to the edges of the small folds. If the stretching takes place diagonally with respect to the edges of the small folds, the band material can moreover be stretched in a second direction. If, for example, the first stretching takes place with an angle of 45° with respect to the edges of the small folds, a second stretching with an angle of 90° with respect to the direction of the first stretching may be further possible. Thus, opposite to the plane of the not-stretched band material, a cap-shaped bump or a hollow, for example, can be produced.

The band material according to the present application can be used for example for the packaging of objects or sealing of openings, the band material being manually plastically mouldable because of its stretching capacity, as well as adaptable to the surface of the object to be covered and may not spring back to its initial shape.

According to the purpose to which the band material is used, the supporting layer comprising fibers may not only have the shape of a foil, but also of a non-woven fabric, of textile fabric or of knitted fabric, the basis weight being able to vary additionally.

The band material may be very light because the covering layer presents only a thin metallic foil. Consequently, the band material may be not only impervious to light and waterproof but also may be impermeable to steam diffusion.

As far as a waterproof embodiment may not be considered as of importance, but the band material may allow a ventilation, slots may be provided for, possibly transversely to the edges. Advantageously, the slots can be arranged in staggered rows so that the band material can be stretched out transversely to the stretching direction similar to expanded metal.

A particularly cheap and easily mouldable band material may show a supporting layer of polypropylene non-woven material with a basis weight of 10 g/m² and a covering layer of aluminium foil with a thickness of 7 µm and about 30 small folds per cm. When using a non-woven material of polypropylene with a basis weight of 20 g/m² and an aluminium foil with a thickness of 20 µm, the optimum number of folds per cm may be 15.

The band material may be particularly easily adaptable to very rugged surface textures when it additionally shows rough waves transversely to the edges of the small folds. The length of the waves could at least be more than 1 mm in order to avoid that the small folds crumple. Thus, the metallic foil may not tear where sharp ridges and/or bottoms are branching off.

The covering layer can additionally show a second ply or more. The outside ply of the covering layer can be optimally adapted to the purpose of application provided for, the outside ply can, for example, prevent from corrosion and be resistant to weathering and/or be coloured. Such a band material can, for example, show a polyester non-woven material with a basis weight of 30 g/m², and an aluminium foil with a thickness of 20 µm, coated with 10 g enamel per m², and about 12 small folds per cm.

The band material may be particularly resistant to the weathering and/or resistant to tearing if it additionally shows a coating of plastically or thermoplastically mouldable material. The additional coating can, for instance, comprise bitumen, polyisobutylene, acrylate, polyurethane, hotmelt or a foamed material, possibly such material with high recuperative capacity. An additional coating which swells under the influence of humidity may also be advantageous. This additional coating can possibly be applied on the covering layer, it may still also be applied onto the supporting layer or even on both sides. As the band material can itself be already waterproof, a very thin coating may already be sufficient to obtain special surface properties. The additional coating can also be arranged between the covering layer and the supporting layer. A band material which may be most resistant to tearing shows, for example in the order from the bottom to the top, polyester non-woven material, polyester foil, aluminium foil and enamel.

In order to close an opening it may be particularly easy to fix the band material on the edge of the opening if the band material shows at least on one of its both longitudinal edges a bonding sheet of extensible self-adhesive material. The bonding sheet can be applied in the form of a narrow strip. Thus, the band material can be bound to the base without additional glue, in order to avoid that the coiled up band material sticks together, the bonding sheet can be covered with a protective film which can be withdrawn on the spot.

The bonding sheet may possibly be applied on the supporting layer.

For some purposes of application corresponding preforms out of the band material can be manufactured.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Figure 1:
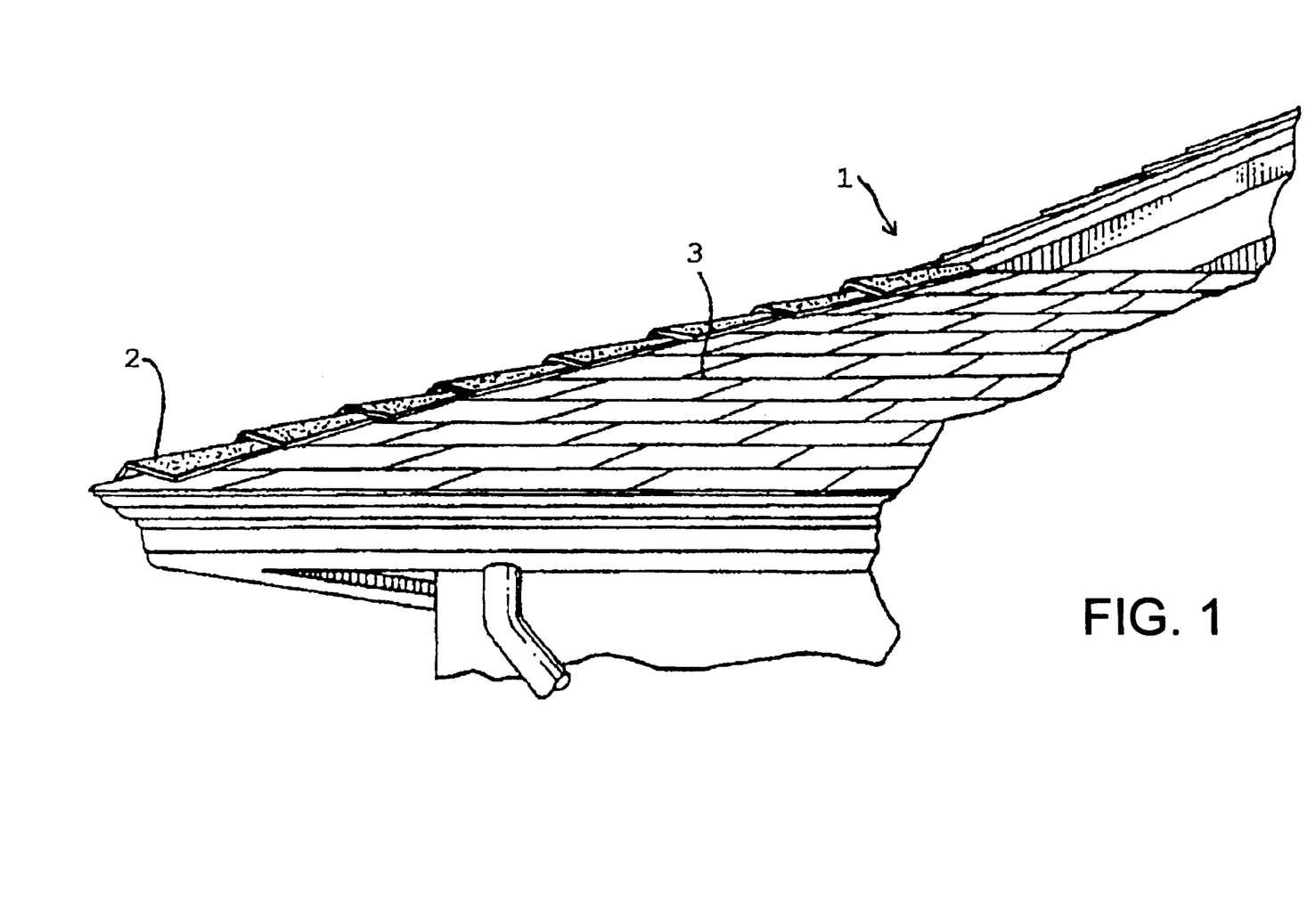
FIG. 1 is a perspective view of a roof.

Referring first to FIG. 1, a roof 1 is shown with a ridge cover 2 and roof covering 3.

Figure 2:
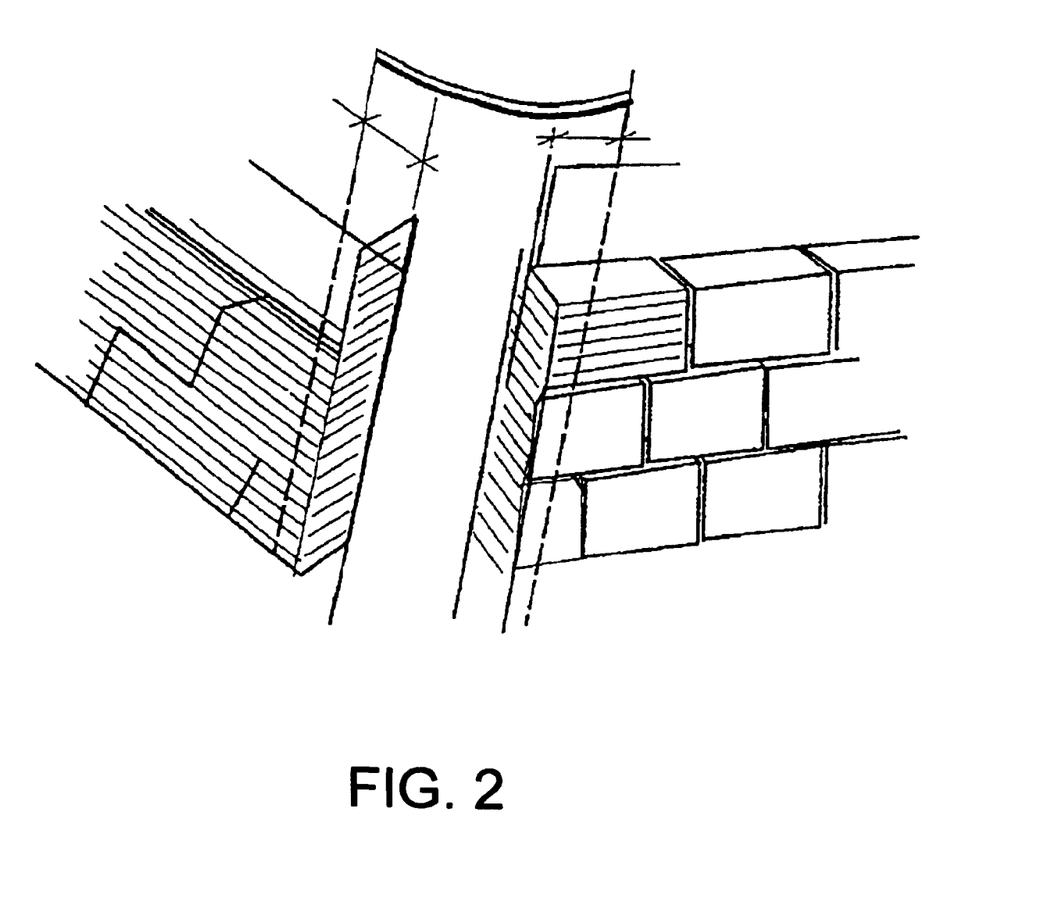
FIG. 2 shows a covering material covering the gap between two different parts.

Referring now to FIG. 2, a covering material 4 is shown covering the gap 5 between a first part 6 and a second part 7.

Figure 3:
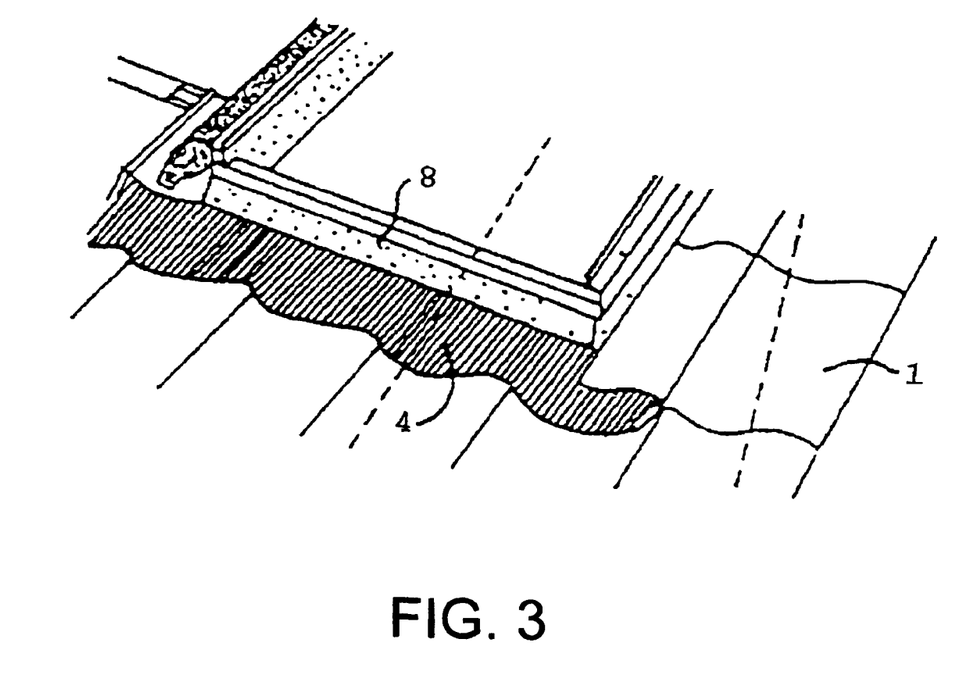
FIG. 3 shows a material placed between a roof and a structure projecting out of the roof.

FIG. 3 shows a material 4 placed between a roof 1 and a structure 8 projecting out of the roof 1.

Figure 4:
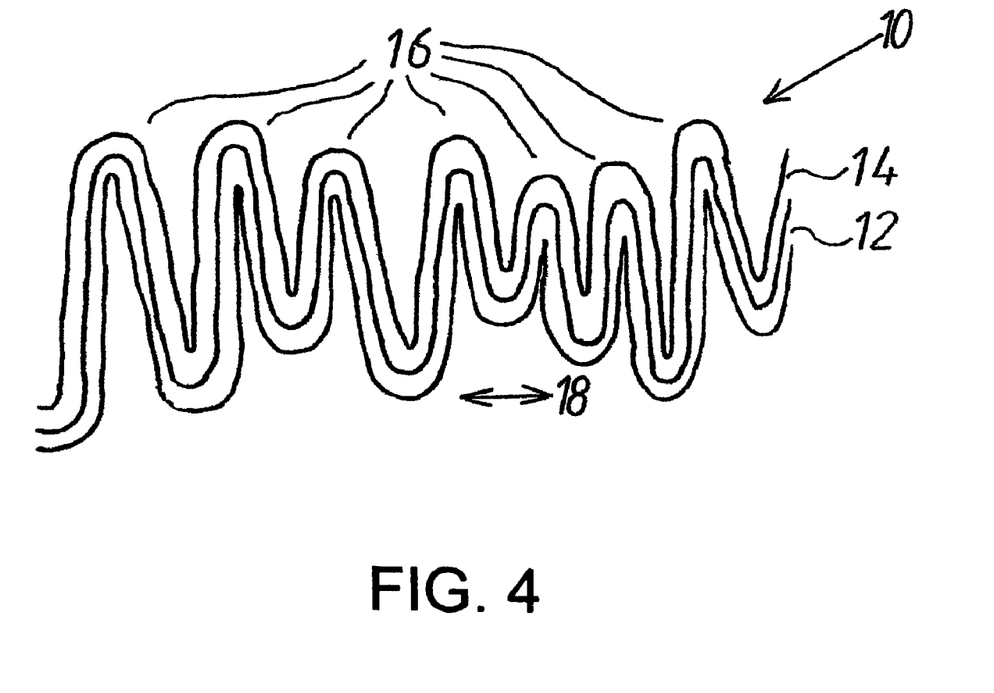
FIG. 4 is an enlarged view of a longitudinal section through the band material according to the present application.

FIG. 4 is an enlarged schematic view of a longitudinal section of the band material 10 according to the present application. The band material 10 shows a supporting layer 12 and a covering layer 14 bound to it. The supporting layer 12 has the shape of a non-woven material with statistically distributed fibres. The covering layer 14 is embodied in the form of a foil of annealed aluminium with a thickness of 7 μm. The supporting layer 12 and the covering layer 14 stick together on the whole surface. Both layers 12 and 14 are folded in multiple irregular microscopic folds 16 whose edges cross the stretching direction indicated by the double arrow 18 and extend substantially parallel to each other. The height of the folds is less than 1 mm.

Figure 5:
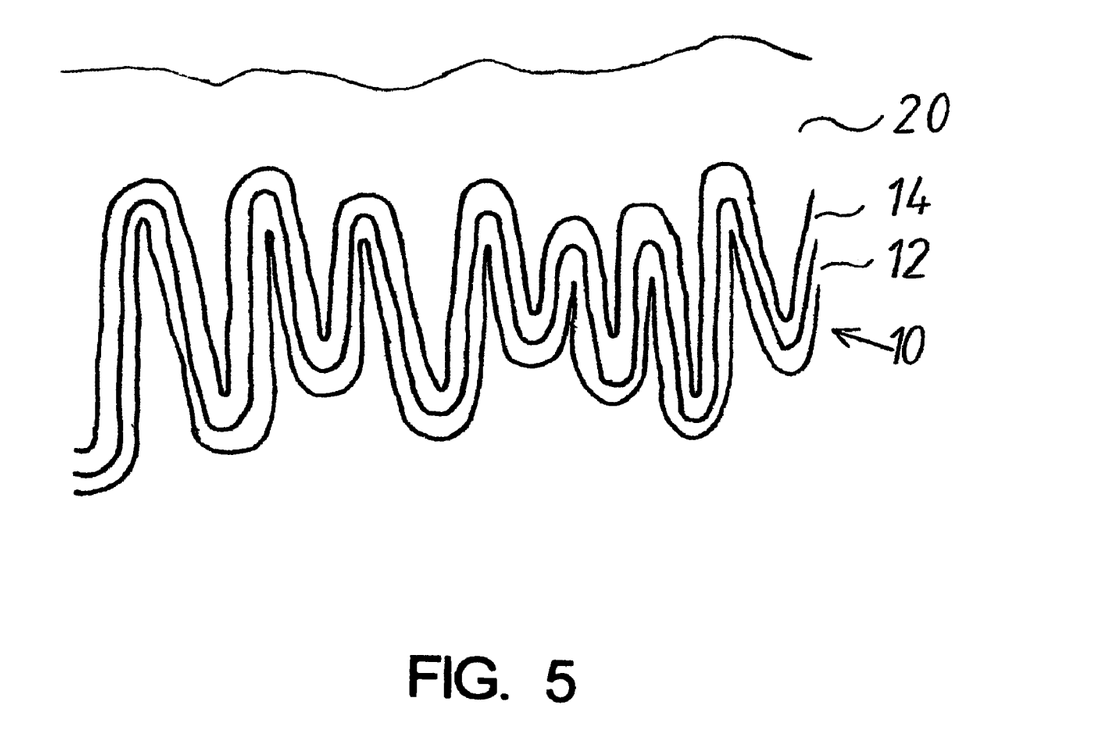
FIG. 5 is the band material of FIG. 4 with an additional coating.

FIG. 5 is also an enlarged view of a longitudinal section of the band material 10 of FIG. 4. A thick coat of bitumen 20 has been additionally applied on the upper side of the covering layer 14.

Figure 6:
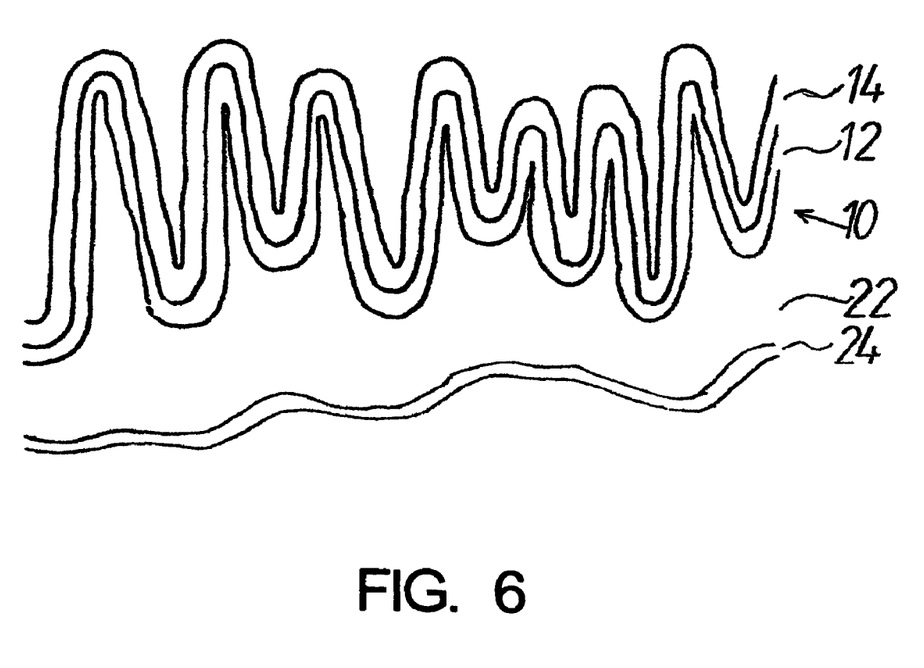
FIG. 6 is the band material of FIG. 4 with a bonding sheet of extensible self-adhesive material.

FIG. 6 is also an enlarged view of a longitudinal section of the band material 10 of FIG. 4. A bonding sheet 22 of self-adhesive butyle rubber is additionally applied on the underside of the supporting layer 12. The bonding sheet 22 is covered with a protective film 24 in order to prevent the band material to stick together when being coiled up for delivery.

One feature or aspect of an embodiment is believed at the time of the filing of this patent application to possibly reside broadly in a stretchable band material with at least one supporting layer and one covering layer, the band material showing a multiplicity of folds whose edges extend crosswise with respect to the stretching direction and substantially parallel to each other, characterized in that the supporting layer comprises fibres of organic material, that the covering layer shows a foil of ductile material and that the folds have the shape of small folds bordering one another, in which the additional material needed for stretching is stored.

Another feature or aspect of an embodiment is believed at the time of the filing of this patent application to possibly reside broadly in a stretchable band material, characterized in that the band material is additionally corrugated, transversely to the edges of the small folds.

A further feature or aspect of an embodiment is believed at the time of the filing of this patent application to possibly reside broadly in a stretchable band material with at least one supporting layer and one covering layer, the band material showing a multiplicity of folds whose edges extend crosswise with respect to the stretching direction and substantially parallel to each other, characterized in that the supporting layer comprises fibres of organic material, that the covering layer shows a foil of ductile material and that the folds have the shape of microscopic folds bordering one another, in which the additional material needed for stretching is stored.

Another feature or aspect of an embodiment is believed at the time of the filing of this patent application to possibly reside broadly in a stretchable band material, characterized in that the supporting layer appears in the form of non-woven material.

Yet another feature or aspect of an embodiment is believed at the time of the filing of this patent application to possibly reside broadly in a stretchable band material, characterized in that the supporting layer appears in the form of textile fabric.

Still another feature or aspect of an embodiment is believed at the time of the filing of this patent application to possibly reside broadly in a stretchable band material, characterized in that the supporting layer appears in the form of knitted fabric.

A further feature or aspect of an embodiment is believed at the time of the filing of this patent application to possibly reside broadly in a stretchable band material, characterized in that the covering layer shows at least two plies.

Another feature or aspect of an embodiment is believed at the time of the filing of this patent application to possibly reside broadly in a stretchable band material, characterized in that the band material is additionally corrugated, transversely to the edges of the microscopic folds.

Still another feature or aspect of an embodiment is believed at the time of the filing of this patent application to possibly reside broadly in a stretchable band material, characterized in that the band material additionally shows a coating of plastically mouldable material.

Yet another feature or aspect of an embodiment is believed at the time of the filing of this patent application to possibly reside broadly in a stretchable band material, characterized in that the band material shows a bonding sheet of extensible self-adhesive material at least on one of its both longitudinal edges.

A further feature or aspect of an embodiment is believed at the time of the filing of this patent application to possibly reside broadly in a stretchable band material, characterized in that the bonding sheet is applied on the supporting layer.

Another feature or aspect of an embodiment is believed at the time of the filing of this patent application to possibly reside broadly in a stretchable band material, characterized in that the bonding sheet is covered with a protective film.

According to another possible embodiment, the object is realised in that the supporting layer comprises fibres of organic material, in that the covering layer shows a foil of ductile metal and in that the folds have the shape of microscopic folds bordering one another in which the additional material needed for stretching is stored.

The supporting layer comprising fibres of organic material confers to the band material a high resistance to tearing. Natural fibres, such as wool or silk, as well as such ones of plastic are to be taken into consideration as organic material, the length, the diameter, the shape of the cross section and the chemical composition of the fibres being optimally adaptable to the purpose of the application of the band material. Fibres of polyethylene, polypropylene, polyacrylnitrile, polyester or polyamide are recommended as especially appropriate. The supporting layer increases the resistance to tearing of the metallic covering layer and prevents it from a too strong crumpling in the area of the edges of the microscopic folds.

The metallic foil of the covering layer is plastically mouldable and does not produce any restoring force due to the ductility of the material used so that the band material keeps the shape for instance after moulding around an uneven base and does not intend to come back to its previous shape. Possibly lead, copper or soft-annealed aluminium are to be taken into consideration as ductile metals for the metallic foil of the covering layer.

The microscopic folds defined according to the present application are microscopic folds, about 10 or more of which are arranged within one centimeter of the band material, possibly 30 or more folds per centimeter. The folds border one another, edges issuing from clockwise folding alternating with edges issuing from anticlockwise folding. The space between two edges formed by two opposite foldings should not be substantially more than 1 mm and must not always be the same. A fold must not extend over the whole width of the band material, either. The microscopic folds may perfectly be irregular and of different shape. The microscopic folds are possibly impressed into the originally even two-ply band material, the material being compressed in an opposite direction or diagonally with respect to the stretching direction. The importance of the compression determines the later possible extension. For example, a band compressed to the half of its previous length can thus be later extended up to just twice the length. The additional material needed for stretching out is stored in the microscopic folds which are drawn flat when stretching. It is clear that the maximum stretching is to be obtained in the stretching direction extending in a right angle with respect to the edges of the microscopic folds. If the stretching takes place diagonally with respect to the edges of the microscopic folds, the band material can moreover be stretched in a second direction. If, for example, the first stretching takes place with an angle of 45° with respect to the edges of the microscopic folds, a second stretching with an angle of 90° with respect to the direction of the first stretching is further possible. Thus, opposite to the plane of the not-stretched band material, a cap-shaped bump or a hollow, for example, can be produced.

The band material according to the present application can be used for example for the packaging of objects or sealing of openings, the band material being manually plastically mouldable because of its stretching capacity, as well as adaptable to the surface of the object to be covered and does not spring back to its initial shape.

According to the purpose to which the band material is used, the supporting layer comprising fibers cannot only have the shape of a foil, but also of a non-woven fabric, of textile fabric or of knitted fabric, the basis weight being able to vary additionally.

The band material is very light because the covering layer presents only a thin metallic foil. Consequently, the band material is not only impervious to light and waterproof but also impermeable to steam diffusion.

As far as a waterproof embodiment is not considered as of importance, but the band material has to allow a ventilation, slots may be provided for, possibly transversely to the edges. Advantageously, the slots are arranged in staggered rows so that the band material can be stretched out transversely to the stretching direction similar to expanded metal.

A particularly cheap and easily mouldable band material shows a supporting layer of polypropylene non-woven material with a basis weight of 10 g/m² and a covering layer of aluminium foil with a thickness of 7 μm and about 30 microscopic folds per cm. When using a non-woven material of polypropylene with a basis weight of 20 g/m² and an aluminium foil with a thickness of 20 μm, the optimum number of folds per cm is 15.

The band material is particularly easily adaptable to very rugged surface textures when it additionally shows rough waves transversely to the edges of the microscopic folds. The length of the waves should at least be more than 1 mm in order to avoid that the microscopic folds crumple. Thus, the metallic foil cannot tear where sharp ridges and/or bottoms are branching off.

The covering layer can additionally show a second ply or more. The outside ply of the covering layer can be optimally adapted to the purpose of application provided for, the outside ply can, for example, prevent from corrosion and be resistant to weathering and/or be coloured. Such a band material can, for example, show a polyester non-woven material with a basis weight of 30 g/m², and an aluminium foil with a thickness of 20μm, coated with 10 g enamel per m², and about 12 microscopic folds per cm.

The band material is particularly resistant to the weathering and/or resistant to tearing if it additionally shows a coating of plastically or thermoplastically mouldable material. The additional coating can, for instance, comprise bitumen, polyisobutylene, acrylate, polyurethane, hotmelt or a foamed material, possibly such material with high recuperative capacity. An additional coating which swells under the influence of humidity is also advantageous. This additional coating is possibly applied on the covering layer, it may still also be applied onto the supporting layer or even on both sides. As the band material is itself already waterproof, a very thin coating is already sufficient to obtain special surface properties. The additional coating can also be arranged between the covering layer and the supporting layer. A band material which is most resistant to tearing shows, for example in the order from the bottom to the top, polyester non-woven material, polyester foil, aluminium foil and enamel.

In order to close an opening it is particularly easy to fix the band material on the edge of the opening if the band material shows at least on one of its both longitudinal edges a bonding sheet of extensible self-adhesive material. The bonding sheet can be applied in the form of a narrow strip. Thus, the band material can be bound to the base without additional glue, in order to avoid that the coiled up band material sticks together, the bonding sheet can be covered with a protective film which can be withdrawn on the spot.

The bonding sheet is possibly applied on the supporting layer.

For some purposes of application corresponding preforms out of the band material can be manufactured.

The components disclosed in the various publications, disclosed or incorporated by reference herein, may possibly be used in possible embodiments of the present application, as well as equivalents thereof.

A possible embodiment relates to a stretchable band material with at least one supporting layer and one covering layer, said band material showing a multiplicity of folds whose edges extend crosswise with respect to the stretching direction and substantially parallel to each other. In order to provide a waterproof band material which is less expensive than known covering material and less sensitive, it is proposed that the supporting layer comprises fibres of organic material, that the covering layer shows a foil of ductile metal and that the folds have the shape of microscopic folds bordering one another in which the additional material needed for stretching is stored. The supporting layer appears preferably in the form of non-woven fabric, textile fabric or knitted fabric. The covering layer can show two or more plies, the band material can also additionally show a coating of plastically mouldable material.

Some examples of roofing materials which may possibly be utilized or adapted for use in at least one possible embodiment may possibly be found in the following U.S. Pat. Nos. 5,377,459; 5,379,517; 5,380,552; 5,382,449; 5,389,715; 5,395,703; 5,400,558; 5,406,764; 5,414,965; 5,415,511; 5,421,134; 5,426,898; 5,437,923; 5,438,810; 5,440,855; 5,471,801; and 5,474,838.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

An example of a roof covering which may possibly be utilized or adapted for use in at least one possible embodiment may possibly be found in U.S. Pat. 6,502,353, entitled "Roof covering and its method of making and using, comprising a rib mesh corrugated with at least one outer layer, the generally parallel corrugations permitting deformation without restoring creep." U.S. Pat. 6,502,353 is hereby incorporated by reference as if set forth in its entirety herein.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . ." may possibly not be used or useable in any one or more embodiments of the application.

The sentence immediately above relates to patents, published patent applications and other documents either incorporated by reference or not incorporated by reference.

Some examples of crepe-like materials or processes for making crepe-like materials which may possibly be utilized or adapted for use in at least one possible embodiment may possibly be found in the following U.S. Pat. Nos. 5,394,624; 5,403,446; 5,409,572; 5,417,797; 5,419,464; 5,431,786; and 5,468,796.

The corresponding foreign and international patent publication applications, namely, Federal Republic of Germany Patent Application 102 30 552.8, filed on Jul. 5, 2002, having inventor Peter Brinkmann, and DE-OS 102 30 552.8 and DE-PS 102 30 552.8, and International Application PCT/DE2003/002237, filed on Jul. 4, 2003, having WIPO Publication WO2004/005016 A1 and inventor Peter Brinkmann, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Some examples of polyisobutylene materials which may possibly be utilized or adapted for use in at least one possible embodiment may possibly be found in the following U.S. Pat. Nos. 5,378,779; 5,389,430; 5,416,176; 5,442,010; 5,442,015; No. 5,458,796; and 5,461,122.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Some examples of non-woven polyesters which may possibly be utilized or adapted for use in at least one possible embodiment may possibly be found in the following U.S. Pat. Nos. 5,380,582; 5,415,738; 5,419,953; 5,429,066; 5,445,874; 5,464,096; 5,465,739; 5,470,492; and 5,474,838.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

Some examples of crepe-like materials or processes for making crepe-like materials which may possibly be utilized or adapted for use in at least one possible embodiment may possibly be found in the following U.S. Pat. Nos. 5,394,624; 5,403,446; 5,409,572; 5,417,797; 5,419,464; 5,431,786; and 5,468,796.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

Some examples of acroylonitrile non-woven materials which may possibly be utilized or adapted for use in at least one possible embodiment may possibly be found in the following U.S. Pat. Nos. 5,385,656; 5,385,774; 5,393,845; 5,397,627; 5,401,499; 5,401,576; 5,403,361; 5,410,053; 5,414,216; 5,418,284; 5,426,148; 5,434,205; 5,442,815; 5,443,598; 5,464,465; 5,468,529; and 5,470,485.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of covering a gap between two structures of a building, using a stretchable building gap covering comprising: at least one supporting layer and a covering layer supported by said supporting layer; said stretchable building gap covering comprising a plurality of folds being configured and disposed to extend substantially parallel to each other, and transverse to a direction in which said stretchable building gap covering may be stretched or extended in length to permit extension of said stretchable building gap covering to at least 100% of its length; said plurality of folds comprising approximately ten to at least thirty folds in one centimeter of length of said stretchable building gap covering; said at least one supporting layer comprising fibers; said covering layer comprising a foil of ductile or plastically moldable material; and said covering layer having a thickness of about 7 micrometers (µm) to about 20 micrometers (µm), said method comprising the steps of:
   placing said stretchable building gap covering over a gap between two structures of a building; and
   stretching said stretchable building gap covering up to at least 100% of its length to increase the area covered by said stretchable building gap covering to an amount sufficient to cover said gap.

2. A stretchable building gap covering for covering a gap between two structures of a building, said stretchable building gap covering comprising:
   at least one supporting layer and a covering layer supported by said supporting layer;
   a plurality of folds being configured and disposed to extend substantially parallel to each other, and transverse to a direction in which said stretchable building gap covering may be stretched or extended in length to permit extension of said stretchable building gap covering to at least 100% of its length;
   said plurality of folds comprising approximately ten to at least thirty folds in one centimeter of length of said stretchable building gap covering;
   said at least one supporting layer comprising natural fibers;
   said covering layer comprising a foil of ductile or plastically moldable material; and
   said covering layer having a thickness of about 7 micrometers (µm) to about 20 micrometers (µm).

3. The building gap covering, according to claim 2, wherein said natural fibers of said at least one supporting layer comprise at least one of wool or silk fibers.

4. The building gap covering, according to claim 3, wherein:
   said building gap covering has a length and a width less than said length;
   the length of each fold is less than the width of said building gap covering; and
   the cross-sectional height of each fold is less than 1 mm.

5. The building gap covering, according to claim 4, wherein said covering layer comprises lead, copper or soft-annealed aluminium.

6. The building gap covering, according to claim 5, wherein said building gap covering comprises at least one strip of extensible self-adhesive material configured to fix said building gap covering to a building structure.

7. The building gap covering, according to claim 5, wherein said building gap covering comprises slots disposed in staggered rows to permit passage of air through said building gap covering.

8. The building gap covering, according to claim 5, wherein:
   said building gap covering comprises a coating of plastically or thermoplastically moldable material selected from the group consisting of: bitumen, polyisobutylene, acrylate, polyurethane, hotmelt or a foamed material; and
   said coating is disposed at least one of: on said covering layer, on said at least one supporting layer, and between said covering layer and said at least one supporting layer.

9. The building gap covering, according to claim 5, wherein said building gap covering comprises waves or corrugations disposed transverse to said folds, the length of which waves or corrugations are at least more than 1 mm.

10. A stretchable building gap covering for covering a gap between two structures of a building, said stretchable building gap covering comprising:

at least one supporting layer and a covering layer supported by said supporting layer;

a plurality of folds being configured and disposed to extend substantially parallel to each other, and transverse to a direction in which said stretchable building gap covering may be stretched or extended in length to permit extension of said stretchable building gap covering to at least 100% of its length;

said plurality of folds comprising approximately ten to at least thirty folds in one centimeter of length of said stretchable building gap covering;

said at least one supporting layer comprising artificial fibers;

said covering layer comprising a foil of ductile or plastically moldable material; and said covering layer having a thickness of about 7 micrometers (μm) to about 20 micrometers (μm).

11. The building gap covering, according to claim 10, wherein said artificial fibers of said at least one supporting layer comprise at least one of polyethylene, polypropylene, polyacrylnitrile, polyester or polyamide fibers.

12. The building gap covering, according to claim 11, wherein said covering layer comprises lead, copper or soft-annealed aluminium.

13. The building gap covering, according to claim 12, wherein:

said building gap covering has a length and a width less than said length; and the length of each fold is less than the width of said building gap covering.

14. The building gap covering, according to claim 13, wherein the cross-sectional height of each fold is less than 1 mm.

15. The building gap covering, according to claim 14, wherein said building gap covering comprises slots disposed in staggered rows to permit passage of air through said building gap covering.

16. The building gap covering, according to claim 14, wherein:

said building gap covering comprises a coating of plastically or thermoplastically moldable material selected from the group consisting of: bitumen, polyisobutylene, acrylate, polyurethane, hotmelt or a foamed material; and said coating is disposed at least one of: on said covering layer, on said at least one supporting layer, and between said covering layer and said at least one supporting layer.

17. The building gap covering, according to claim 14, wherein said building gap covering comprises waves or corrugations disposed transverse to said folds, the length of which waves or corrugations are at least more than 1 mm.

18. The building gap covering, according to claim 10, wherein:

said at least one supporting layer comprises a polypropylene non-woven material having a weight of 10 $g/m^2$; and said covering layer comprises aluminium foil having a thickness of 7 micrometers (μm) and about 30 folds per centimeter.

19. The building gap covering, according to claim 10, wherein:

said at least one supporting layer comprises a polypropylene non-woven material having a weight of 20 $g/m^2$; and said covering layer comprises aluminium foil having a thickness of 20 micrometers (μm) and about 15 folds per centimeter.

20. The building gap covering, according to claim 10, wherein:

said at least one supporting layer comprises a polyester non-woven material having a weight of 30 $g/m^2$;

said covering layer comprises aluminium foil having a thickness of 20 micrometers (μm) and about 12 folds per centimeter; and said covering layer is coated with an enamel having a weight of 10 $g/m^2$.

* * * * *